(12) United States Patent
Zang

(10) Patent No.: US 11,358,050 B2
(45) Date of Patent: Jun. 14, 2022

(54) ELECTRIC BALANCE CAR

(71) Applicant: ZHEJIANG AERLANG TECHNOLOGY CO., LTD., Yong Kang (CN)

(72) Inventor: Chuanmei Zang, Yong Kang (CN)

(73) Assignee: ZHEJIANG AERLANG TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 17/115,399

(22) Filed: Dec. 8, 2020

(65) Prior Publication Data

US 2021/0086059 A1 Mar. 25, 2021

Related U.S. Application Data

(62) Division of application No. 16/976,440, filed as application No. PCT/CN2019/076153 on Feb. 26, 2019.

(30) Foreign Application Priority Data

Feb. 28, 2018 (CN) .......................... 201820281176.2

(51) Int. Cl.
*A63C 17/12* (2006.01)
*A63C 17/01* (2006.01)

(52) U.S. Cl.
CPC ............ *A63C 17/12* (2013.01); *A63C 17/014* (2013.01); *A63C 2203/12* (2013.01)

(58) Field of Classification Search
CPC .... A63C 17/12; A63C 2203/12; A63C 17/014
See application file for complete search history.

(56) References Cited

U.S. PATENT DOCUMENTS

| | | | |
|---|---|---|---|
| 2017/0088212 A1* | 3/2017 | Edney | B62K 11/007 |
| 2017/0166278 A1* | 6/2017 | Lu | B60K 1/04 |
| 2017/0183053 A1* | 6/2017 | Zeng | B62K 11/007 |
| 2018/0214766 A1* | 8/2018 | Ying | A63C 17/014 |
| 2018/0334214 A1* | 11/2018 | Cuban | B62J 15/02 |
| 2019/0023344 A1* | 1/2019 | Shang | A63C 17/12 |
| 2019/0077479 A1* | 3/2019 | Chen | B62K 11/007 |
| 2019/0092387 A1* | 3/2019 | Ying | B62D 51/02 |
| 2020/0346099 A1* | 11/2020 | Li | A63C 17/016 |

FOREIGN PATENT DOCUMENTS

| | | |
|---|---|---|
| CN | 105416468 A | 3/2016 |
| CN | 205239800 U | 5/2016 |
| CN | 205365912 U | 7/2016 |
| CN | 205554418 U | 9/2016 |

OTHER PUBLICATIONS

Supplementary European Search Report dated Oct. 4, 2021 for PCT/CN20190761513, Application No. 19760401.

* cited by examiner

*Primary Examiner* — Brian L Swenson
(74) *Attorney, Agent, or Firm* — Birch, Stewart, Kolasch & Birch, LLP

(57) ABSTRACT

An electric balance car comprises a left car body, a right car body, a rotation mechanism and wheels, wherein the left car body is connected to the right car body through the rotation mechanism, the wheels are mounted on the left car body and the right car body, the axes of axles of the wheels are lower than the axis of a rotary shaft in the rotation mechanism. The electric balance car can be controlled steadily and is ingenious in structure, easy to assemble and durable.

10 Claims, 3 Drawing Sheets

ELECTRIC BALANCE CAR

CROSS-REFERENCE TO RELATED APPLICATIONS

This application is a Divisional of copending application Ser. No. 16/976,440, filed on Aug. 27, 2020, which is the National Phase under 35 U.S.C. § 371 of International Application No. PCT/CN2019/076153, filed on Feb. 26, 2019, which claims the benefit under 35 U.S.C. § 119(a) to Patent Application No. 201820281176.2, filed in China on Feb. 28, 2018, all of which are hereby expressly incorporated by reference into the present application.

BACKGROUND OF THE INVENTION

Technical Field

The invention relates to an electric balance car.

Description of Related Art

Electric balance cars, which are typically designed based on the principle of "dynamic stability", adopt a gyroscope and an acceleration sensor in the car body to detect attitude changes of the car body and use a servo control system to drive a motor to perform corresponding adjustment to keep the system balanced, are novel, environmentally-friendly tools for riding and recreation. Generally, two-wheeled electric balance cars mainly comprise hub motors provided with wheel axles, pedals disposed between the two hub motors, and the like.

BRIEF SUMMARY OF THE INVENTION

The invention relates to an electric balance car which is ingenious in structure, easy to assemble and durable.

The invention is implemented through the following technical solution:

An electric balance car comprises a left car body, a right car body, a rotation mechanism and wheels, wherein the left car body is connected to the right car body through the rotation mechanism, the wheels are mounted on the left car body and the right car body, the axes of axles of the wheels are lower than the axis of a rotary shaft in the rotation mechanism.

As a further improvement of the invention, the left car body and the right car body comprise upper car frames and lower car frames, and fixing bases for mounting the axles of the wheels are disposed on the upper car frames.

As a further improvement of the invention, concave grooves matched with cross-sections of the axles of the wheels are disposed on lower surfaces of the fixing bases.

As a further improvement of the invention, the electric balance car further comprises mounting bases, wherein the axles of the wheels are mounted on the fixing bases through mounting bases, and the fixing bases and the mounting bases are connected through fasteners.

As a further improvement of the invention, the fixing bases and the upper car frames are integrally formed, or the fixing bases are detachably and fixedly connected with the upper car frames.

As a further improvement of the invention, the electric balance car further comprises control parts, wherein each control part comprises a battery mounted on one upper car frame through a battery case.

As a further improvement of the invention, the battery case has a head part and two root parts, and a space is reserved between the two root parts.

As a further improvement of the invention, each control part further comprises two auxiliary circuit boards, wherein one auxiliary circuit board is mounted at the bottom of an auxiliary circuit board support which is disposed on the upper car frame, and the other auxiliary circuit board is mounted at the bottom of the battery case.

As a further improvement of the invention, the auxiliary circuit board support comprises a horizontal plate and two support legs disposed on the upper car frames, and a space for dislocation of the axle of one wheel is reserved between the two support legs.

As a further improvement of the invention, each control part further comprises touch switches mounted on the upper car frame, and openings allowing upper ends of the touch switches to stretch out are formed in the upper car frame.

Beneficial Effects

Compared with the prior art, the electric balance car of the invention has the following beneficial effects:

(1) The axes of the axles of the wheels are lower than the axis of the rotary shaft in the rotation mechanism, so that the clearance between the chassis of the entire car and the ground is increased to allow the car to surmount an obstacle steadily.

(2) The axes of the axles of the wheels are lower than the axis of the rotary shaft in the rotation mechanism to make the center of gravity of the electric balance car higher than the axes of the axles of the wheels, so that the electric balance car can be controlled by means of an intelligent device under a static condition.

To make the above and other objectives, features and advantages of the invention clearer, the invention is detailed below with reference to preferred embodiments and accompanying drawings.

In the figures: 1, upper car frame; 2, wheel; 3, lower car frame; 4, rotation mechanism; 21, mounting base; 31, light panel; 40, rotary shaft; 41, sleeve ring; 42, bearing; 43, semicircular limiting plate; 44, sleeve; 45, limiting base; 51, touch switch; 52, main circuit board; 53, auxiliary circuit board; 54, auxiliary circuit board support; 55, battery case; 103, fixing base; 108, third slot; 301, first slot; 411, limiting part; 1031, concave groove; 1032, reinforcing rib; 3011, notch.

DETAILED DESCRIPTION OF THE INVENTION

To further expound the technical means adopted to fulfill the objective of the invention and the effects of the invention, the specific implementations, structures, features and effects of the invention are detailed below in conjunction with the accompanying drawings and preferred embodiments.

It should be noted that the terms such as "upper" involved in the description of this application is used to indicate directional or positional relations on the basis of the accompanying drawings to facilitate and simplify the description of this application, do not indicate or imply that the devices or elements referred to must have specific directions or must be configured and operated in specific directions, and thus, should not be construed as limitations of this application.

Unless otherwise clearly specified and defined, the terms such as "mount", "connect" and "fix" in this application should be broadly understood. For example, "connect" may refer to fixed connection, detachable connection or integral connection, or mechanical connection or electrical connection, or direct connection or indirect connection with an intermediate medium, or internal communication of two elements. Those ordinarily skilled in the art can appreciate the specific meanings of these terminals in this application as the case may be.

Embodiment

Figure 1:
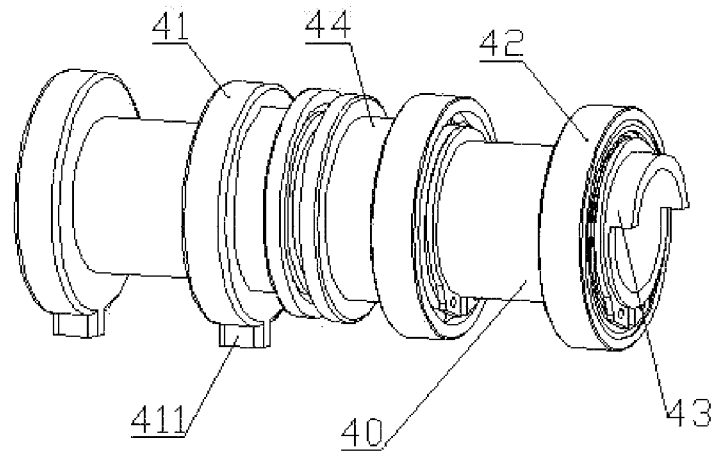
FIG. 1 is structural diagram of a rotation mechanism provided by one embodiment of the invention.
Figure 2:
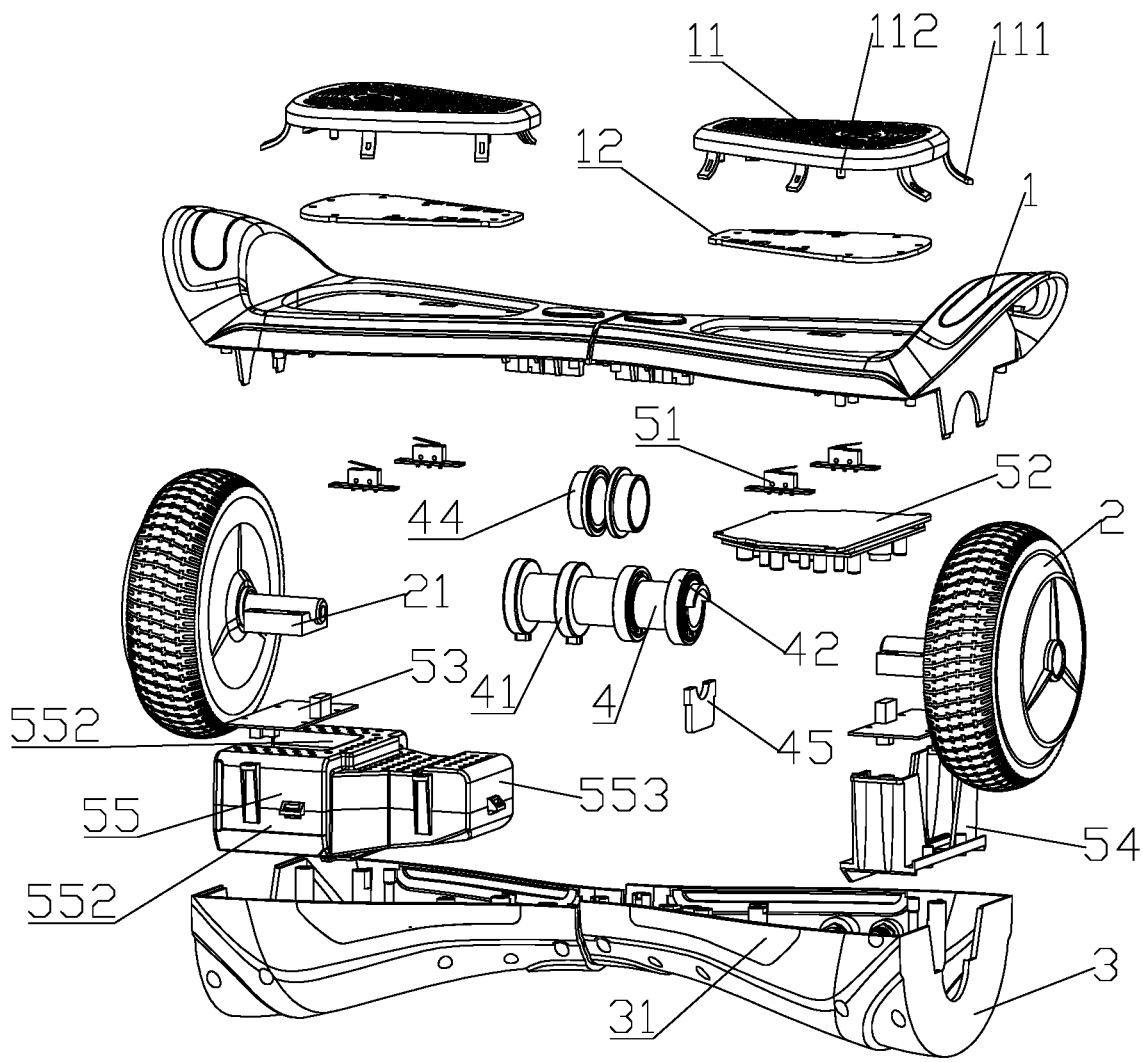
FIG. 2 is a structural diagram of an electric balance car provided by one embodiment of the invention.
Figure 3:
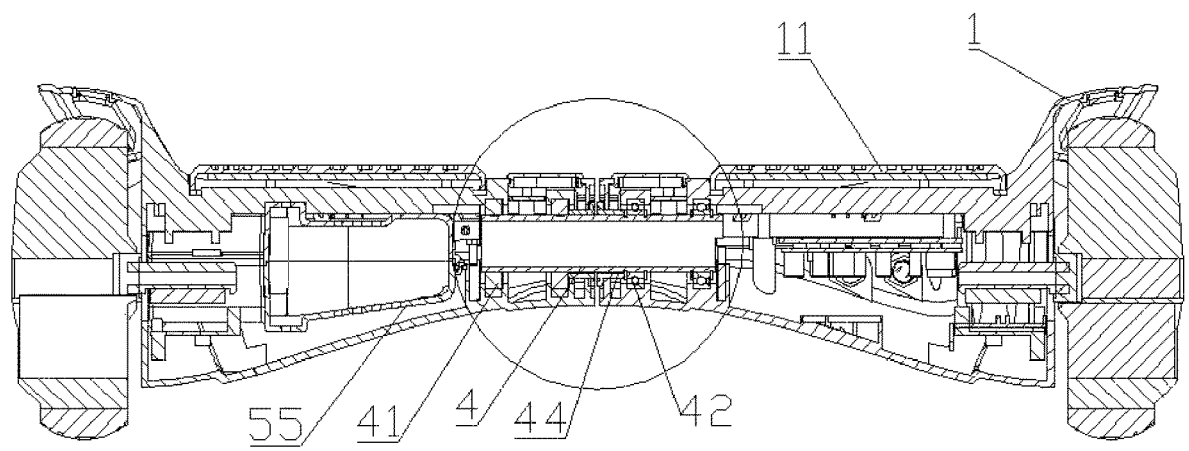
FIG. 3 is a sectional view of an electric balance car provided by one embodiment of the invention.
Figure 4:
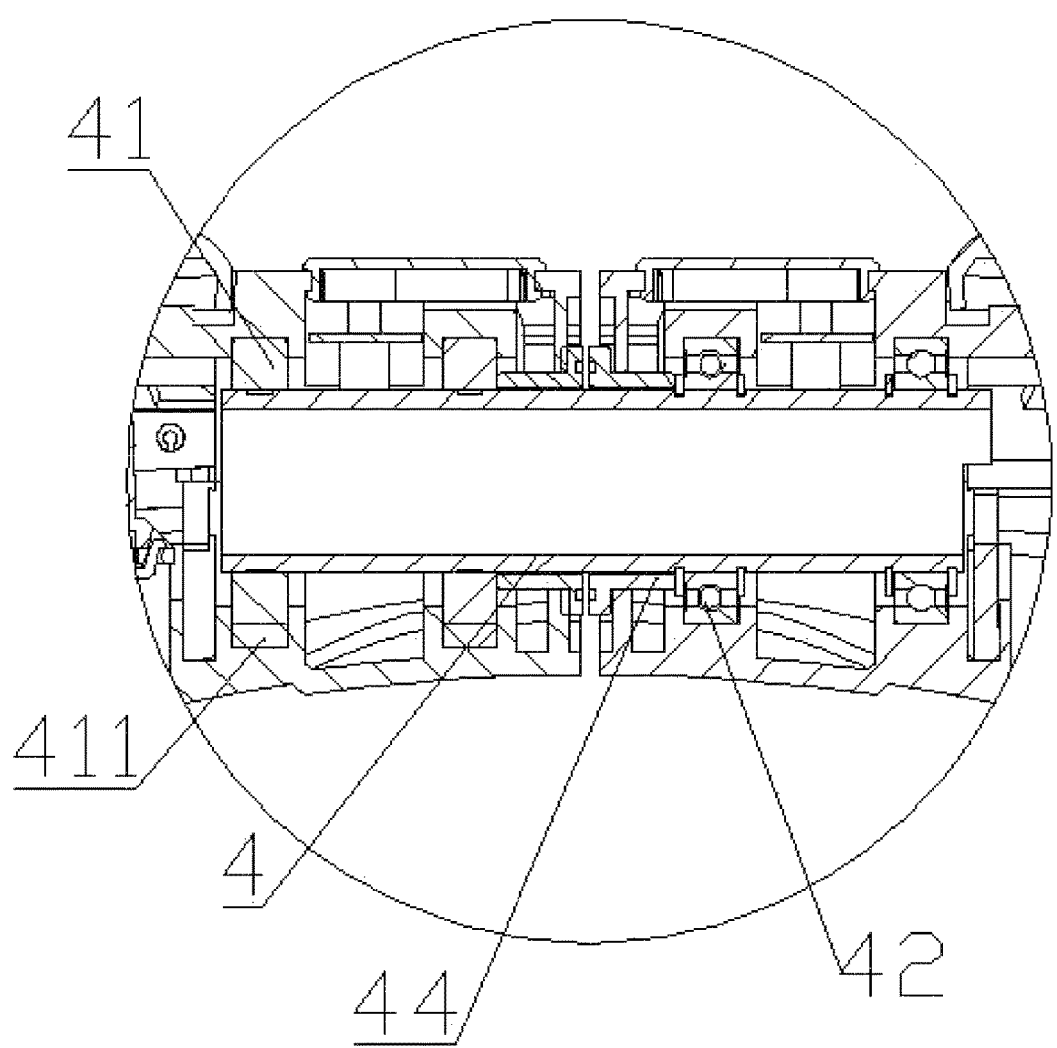
FIG. 4 is a local sectional enlarged view of one embodiment of the invention.
Figure 5:
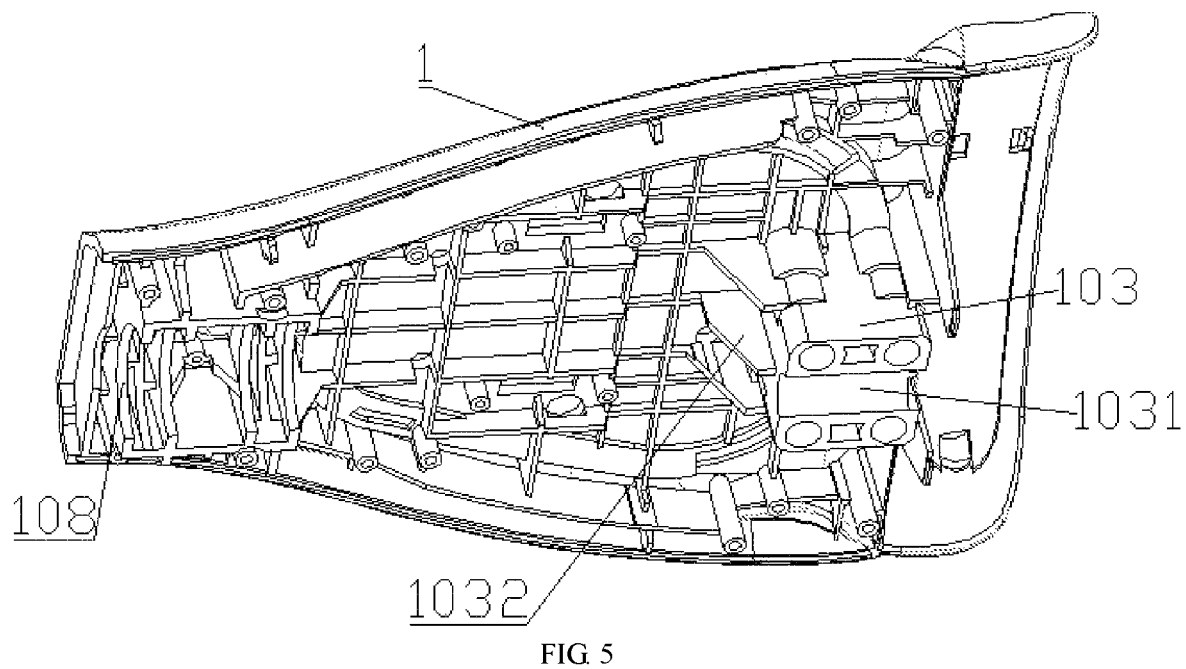
FIG. 5 is a structural diagram of an upper car frame provided by one embodiment of the invention.
Figure 6:
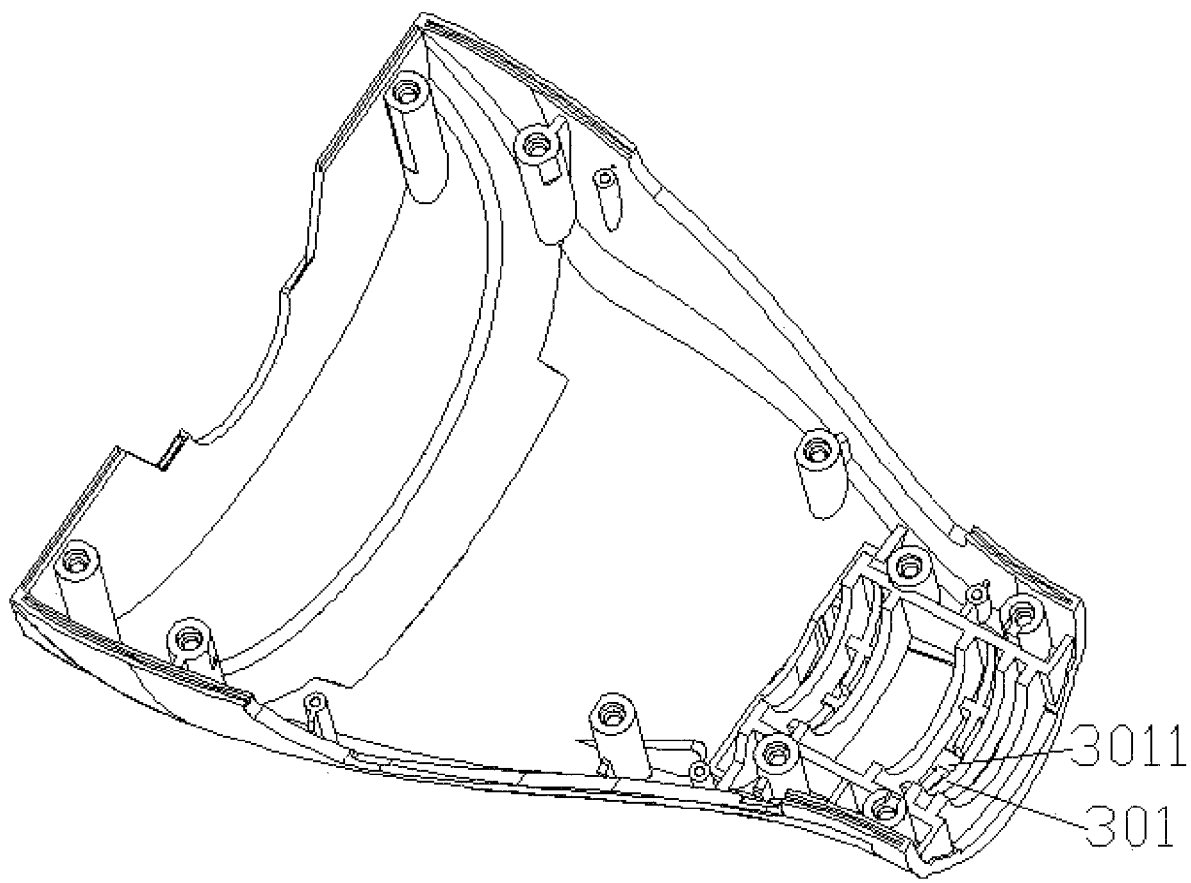
FIG. 6 is a structural diagram of a lower car frame provided by one embodiment of the invention.

Referring to FIG. 1 to FIG. 6, an electric balance car comprises a left car body, a right car body, a rotation mechanism 4, wheels 2 and control parts, wherein the left car body and the right car body are connected through the rotation mechanism 4, the left car body and the right car body comprise upper car frames 1 and lower car frames 3, and after the upper car frames 1 and the lower car frames 3 are assembled together, spaces for mounting wheel 2 axles and the control parts are formed.

The left car body and the right car body are symmetrical in shape. The ends, close to each other, of the two upper car frames 1 are small ends, the ends, away from each other, of the two upper car frames 1 are big ends, and when seen from above, outer edges of the two upper car frames 1 of the electric balance car are approximately in an X shape. The ends, close to each other, of the two lower car frames 3 are small ends, the ends, away from each other, of the two lower car frames 3 are big ends, and when seen from front, outer edges of the two lower car frames 3 are approximately arched.

The rotation mechanism 4 comprises a rotary shaft 40, a sleeve ring 41 and a bearing 42, wherein the sleeve ring 41 is fixedly connected to one side of the rotary shaft 40, the bearing 42 is sheathed on the other side of the rotary shaft 40, a first slot 301 is formed in one lower car frame 3, a second slot is formed in a corresponding position of one upper car frame, and after the upper car frame and the lower car frame are assembled together, a slot space formed by the first slot and the second slot is matched with the sleeve ring 41; a limiting part (411) is protruded outwardly at a position of an outer edge of the sleeve ring (41), and the cross-section of the limiting part is rectangular or in other irregular shapes. When assembled, the sleeve ring 41 in the rotation mechanism 4, together with the limiting part on the sleeve ring, is clamped in the corresponding slot of the car body, and a notch 3011 matched with the limiting part is formed in the corresponding slot, namely first slot 301, of the car body to prevent the rotary shaft 40 from rotating with respect to the car body; a third slot 108 is formed in the other upper car frame 1, a fourth slot is formed in a corresponding position of the other lower car frame, and after the upper car frame and the lower car frame are assembled together, a slot space formed by the third slot 108 and the fourth slot is matched with the bearing 42; and the rotary shaft 40 can rotate with respect to the car body on this side through the bearing 42. Two sleeves 44 are symmetrically disposed around the middle of the rotary shaft 40, a flange is disposed at one end of each sleeve, and the flanges abut against the edges after the upper car frame 1 and the lower car frame 3 are assembled together, the other end of one sleeve 44 abuts against the sleeve ring 41, and the other end of the other sleeve 44 abuts against the bearing 42. The rotary shaft 40 is in the shape of a hollow tube and allows a line to pass through.

Each control part comprises a main circuit board 52, auxiliary circuit boards 53, touch switches 51 and a battery, wherein the battery is mounted on one upper car frame 1 through a battery case 55, the main circuit board 52 is mounted on the upper car frame 1, one auxiliary circuit board 53 is mounted at the bottom of an auxiliary circuit board support 54 disposed on the upper car frame 1, and one auxiliary circuit board 53 is mounted at the bottom of the battery case 55; the touch switches 51 are mounted on the upper car frame 1, and openings allowing the upper ends of the touch switches 51 to stretch out are formed in the upper car frame 1; the auxiliary circuit board support 54 comprises a horizontal plate and two support legs connected with the horizontal plate, connecting plates for enhancing the strength of the auxiliary circuit board support 54 are disposed at the two ends of each support leg and connect the horizontal plate and the support legs, and the two support legs are fixedly mounted on the upper car frame 1 through first fixing columns; one auxiliary circuit board 53 is mounted on a second fixing column below the horizontal plate, and a space for dislocation of a wheel 2 axle is reserved between the two support legs; the main circuit board 52 is electrically connected with the auxiliary circuit boards 53, and the auxiliary circuit boards 53 are eclectically connected with touch switches 51; the battery case 55 has a head part 553 and two root parts 552 and is approximately shaped like Chinese character "pin", and a space is reserved between the two root parts to allow the wheel axle to be mounted on the upper car frame; the battery case 55 comprises an upper battery case and a lower battery case which are buckled together, a buckle hole is formed in the upper battery case, a buckle protrusion is disposed at a corresponding position of the lower battery case 5, and after the upper battery case and the lower battery case are assembled together, the buckle protrusion stretches out of the buckle hole and is locked in the buckle hole; first heat dissipation holes are formed in the upper battery case, and second heat dissipation holes are formed in the lower battery case; and mounting lugs for fixing the battery case 55 on the upper car frame 1 are disposed on a peripheral wall of the lower battery case, and fixing lugs for mounting and fixing the corresponding auxiliary circuit board are disposed at the bottom of the lower battery case.

Pedals 11 are mounted on upper portions of the upper car frames 1 and are able to indirectly or directly contact with the touch switches 51 under the effect of external force. Each pedal 11 has a convex part located on the edge, and a concave part located in the middle and used to restore the pedal 11 after the pedal 11 descends under the effect of acting force. Fixing strips 111 are disposed on the convex parts on the edges of the pedals 11, fixing holes allowing fasteners to penetrate through are formed in the fixing strips, bumps matched with the concave parts of the pedals 11 are disposed on the upper car frames 1, grooves matched with the convex parts on the edges of the pedals 11 are formed in the upper car frames 1 and encircle edges of the bumps, upper surfaces of the bumps are lower than upper surfaces of the upper car frames 1, and first through holes allowing the fixing strips to penetrate through are formed in the grooves. Guide columns 112 are disposed on the concave parts in the middle of the pedals 11, gaskets 12 are disposed between the pedals 11 and the touch switches 51, second through holes allowing the guide columns to penetrate through are formed in corresponding positions of the gaskets 12, and the gaskets 12 can guide the guide columns to allow the pedals 11 to reciprocate upwards and downwards. The openings are formed in the bumps to allow the upper ends of the touch switches to penetrate through. The number of the fixing strips is at least two, the ends, close to the pedals, of the fixing strips are big ends, and the end, away from the pedals, of the fixing strips are small ends.

Fenders which extend outwardly are disposed on the upper car frames 1, cover the wheels 2 and are matched with the wheels in shape, first grooves for accommodating light panels are formed in upper surfaces of the fenders, second grooves for accommodating light panels 31 are formed in front surfaces of the lower car frames 3, and the upper car frames 1 and the lower car frames 3 are connected through fasteners such as screws after being assembled together.

The axes of the wheels 2 axles are lower than the axis of the rotary shaft 40 in the rotation mechanism 4. A semicircular limiting plate 43 is disposed at one end of the rotary shaft 40, and a limiting base 45 for limiting the rotation angle of the semicircular limiting plate 43 is mounted on the corresponding upper car frame 1 or the corresponding lower car frame 3. An upper portion of the limiting base 45 is semicircular, and two semicircular ends of the limiting base 45 abut against the semicircular limiting plate 43 to limit the rotation range of the rotary shaft 40.

Fixing bases 103 for mounting the wheel 2 axles are disposed on the upper car frames 1, and concave grooves 1031 matched with cross-sections of the wheel axles are disposed on the lower surfaces of the fixing bases 103. The wheel 2 axles are mounted on the fixing bases 103 through mounting bases 21, grooves which are matched with the cross-sections of the wheel axles are formed in the mounting bases 21 to prevent the wheel axles against rotation, the fixing bases 103 and the upper car frames 1 may be integrally formed, and reinforcing ribs 1032 are disposed on formed parts to improve the strength of the formed parts. Or, the fixing bases 103 are detachably and fixedly connected with the upper car frames 1, the height difference between the rotation axis of the rotation mechanism and the center axes of the wheel axles can be adjusted as actually needed, and the fixing bases 103 and the mounting bases 21 are connected through fasteners such as screws.

The electric balance car of the invention is ingenious in structure, reasonable in design and suitable for industrial application.

When the electric balance car is used, an operator steps on the pedals 11 and controls, with feet, the pedals to move forwards and downwards or to move backwards and downwards to contact with the touch switches 51, electric signals generated by the touch switches 51 are transmitted to the auxiliary circuit boards 53 to be processed, and then, the whole car is controlled by the main control boards 52 to move forwards or backwards or to make a turn.

The above embodiments are merely preferred ones of the invention, and are not meant to limit the invention in any form. Although the invention has been disclosed above with reference to the preferred embodiments, these embodiments are not intended to limit the invention. Any skilled in the art can obtain other equivalent embodiments by making some transformations or modifications according to the technical contents disclosed above, and any simple transformations or equivalent alterations or modifications made according to the technical essence without deviating from the contents of the technical solution of the invention should also fall within the scope of the technical solution of the invention.

What is claimed is:

1. An electric balance car, comprising a left car body, a right car body, a rotation mechanism (4) and wheels (2), wherein the left car body is connected to the right car body through the rotation mechanism (4), the wheels (2) are mounted on the left car body and the right car body, axes of axles of the wheels (2) are lower than an axis of a rotary shaft (40) in the rotation mechanism (4).

2. The electric balance car according to claim 1, wherein the left car body and the right car body comprise upper car frames (1) and lower car frames (3), and fixing bases (103) for mounting the axles of the wheels (2) are disposed on the upper car frames (1).

3. The electric balance car according to claim 2, wherein concave grooves (1031) matched with cross-sections of the axles of the wheels are disposed on lower surfaces of the fixing bases (103).

4. The electric balance car according to claim 2, further comprising mounting bases (21), wherein the axles of the wheels (2) are mounted on the fixing bases (103) through mounting bases (21), and the fixing bases (103) and the mounting bases (21) are connected through fasteners.

5. The electric balance car according to claim 2, wherein the fixing bases (103) and the upper car frames (1) are integrally formed, or the fixing bases (103) are detachably and fixedly connected with the upper car frames (1).

6. The electric balance car according to claim 2, further comprising a control part, wherein the control part comprises a battery mounted on one said upper car frame (1) through a battery case (55).

7. The electric balance car according to claim 6, wherein the battery case (55) has a head part (553) and two root parts (552), and a space is reserved between the two root parts.

8. The electric balance car according to claim 6, wherein each said control part further comprises two auxiliary circuit boards (53), one said auxiliary circuit board (53) is mounted at a bottom of an auxiliary circuit board support (54) which is disposed on the upper car frame (1), and the other auxiliary circuit board is mounted at a bottom of the battery case (55).

9. The electric balance car according to claim 8, wherein the auxiliary circuit board support (54) comprises a horizontal plate and two support legs disposed on the upper car frames (1), and a space for dislocation of the axle of one said wheel (2) is reserved between the two support legs.

10. The electric balance car according to claim 6, wherein each said control part further comprises touch switches (51) mounted on the upper car frame (1), and openings allowing upper ends of the touch switches (51) to stretch out are formed in the upper car frame (1).

* * * * *